(No Model.)  3 Sheets—Sheet 1.
F. WHITE.
VELOCIPEDE.
No. 259,444.  Patented June 13, 1882.
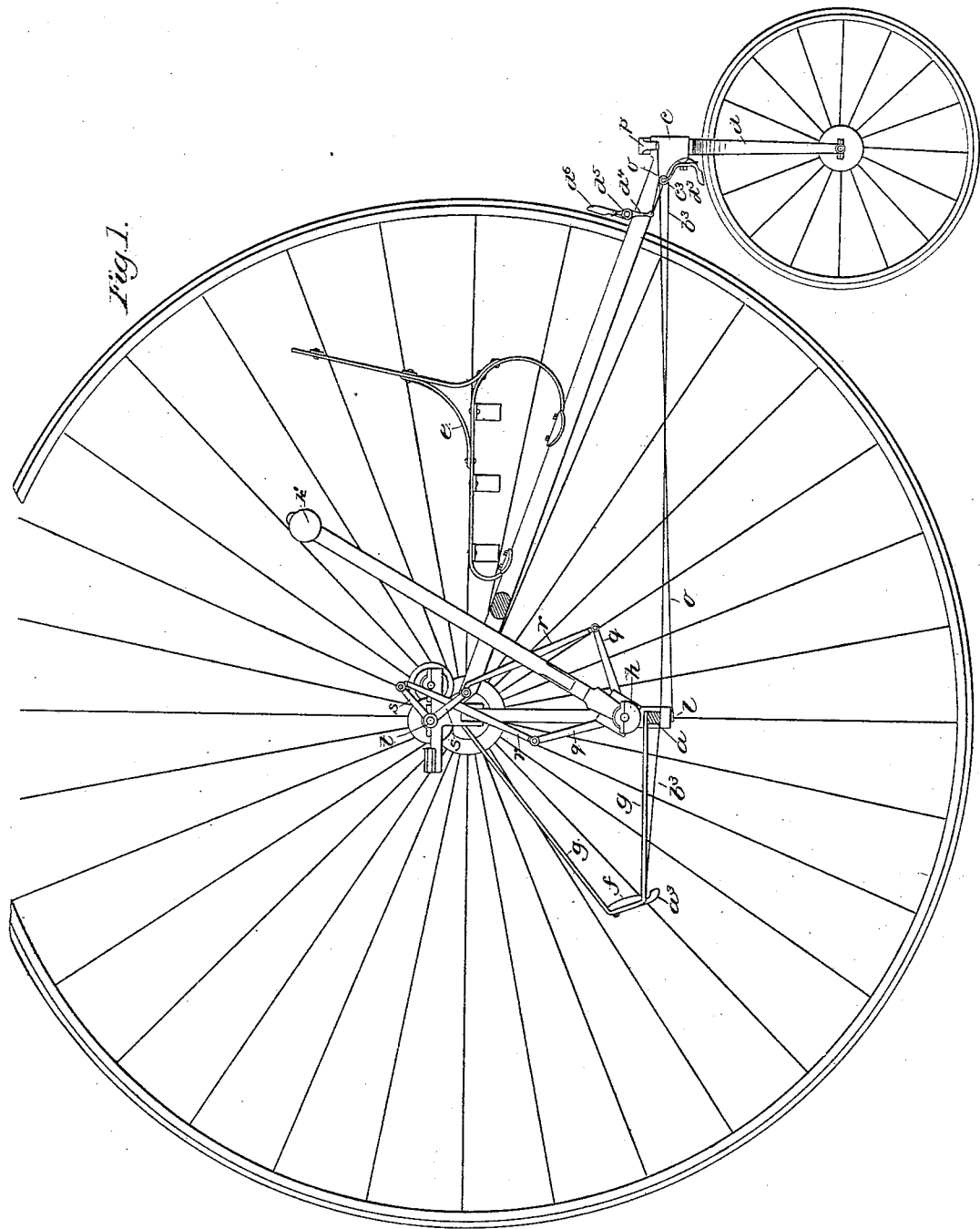
Witnesses.
John F. C. Prendergast
Bernice J. Noyes.
Inventer.
Frederick White
by Crosby Gregory
Attys.

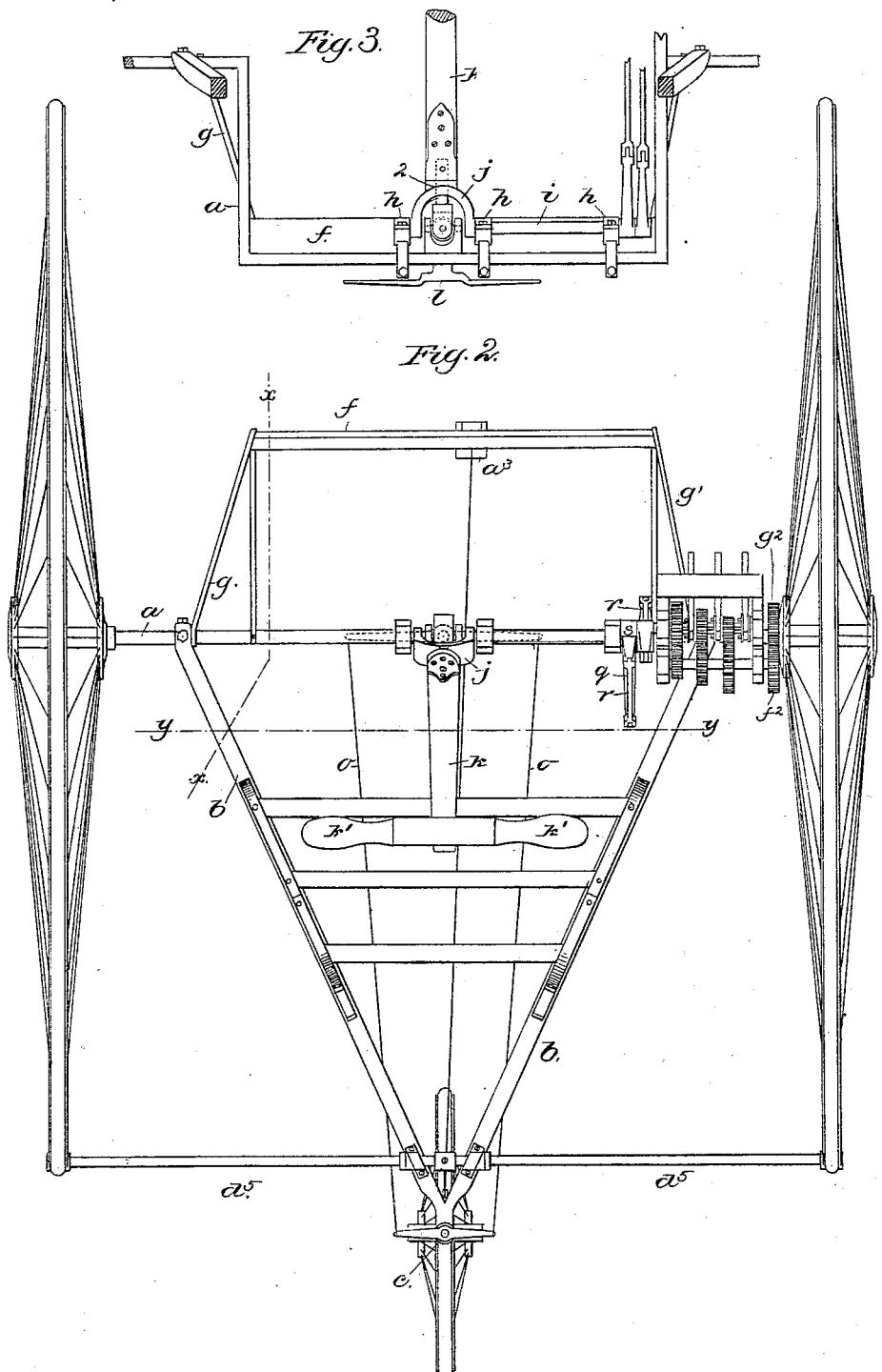

(No Model.) 3 Sheets—Sheet 3.
F. WHITE.
VELOCIPEDE.
No. 259,444. Patented June 13, 1882.
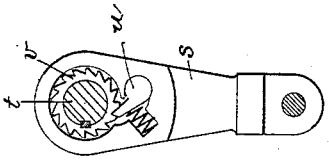
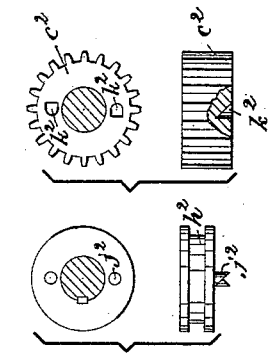
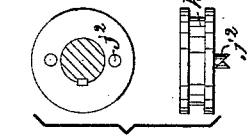
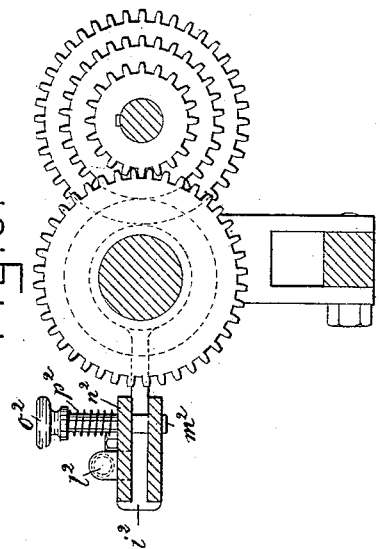
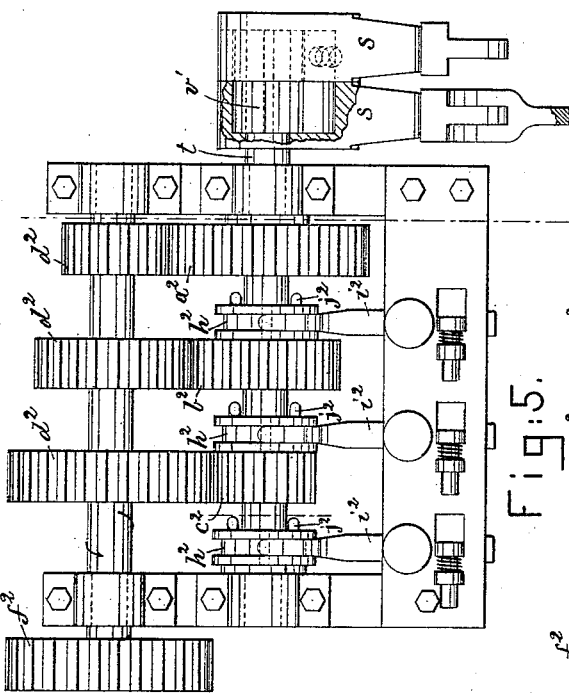
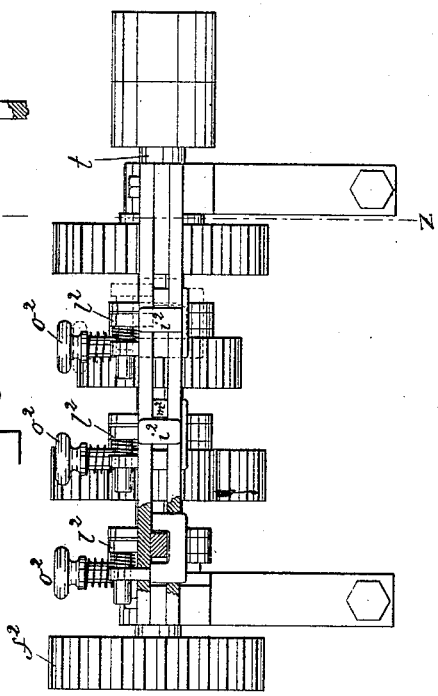
Witnesses.
Bernice J. Noyes.
John F. C. Prinkert.
Inventor.
Frederick White.
by Crosby & Gregory
Attys.
N. PETERS, Photo-Lithographer, Washington, D. C.

UNITED STATES PATENT OFFICE.

FREDERICK WHITE, OF WESTBOROUGH, MASSACHUSETTS, ASSIGNOR OF FIVE-TWELFTHS TO CHARLES R. ROGERS, OF SAME PLACE.

VELOCIPEDE.

SPECIFICATION forming part of Letters Patent No. 259,444, dated June 13, 1882.

Application filed March 18, 1882. (No model.)

*To all whom it may concern:*

Be it known that I, FREDERICK WHITE, of Westborough, county of Worcester, State of Massachusetts, have invented an Improvement in Tricycles, of which the following description, in connection with the accompanying drawings, is a specification.

My invention relates to tricycles, and is embodied in a tricycle which is propelled by a lever operated by the body and arms of the occupant with a movement somewhat similar to that of rowing.

As herein shown, the tricycle has two large wheels of equal size placed side by side, upon one of which the propelling mechanism takes effect, and a smaller steering-wheel placed in the rear of the said large wheels, the said wheels being connected by suitable frame-work sustaining a seat for the occupant at the rear of the axle of the large wheels, and a foot-sustaining rest or platform at a proper position in front of the said seat.

The axle upon which the large wheels are mounted is bent downward at its middle portion, which is provided with bearings for a rocking lever adapted to be oscillated forward and backward by the arms of the operator; and the invention consists partly in the combination of the said propelling-lever with transmitting mechanism, by which the force is transmitted to the driving-wheel, and with steering mechanism, by which the steering-wheel is governed by a rotary movement of the said propelling-lever, the said steering and propelling mechanisms being independent of one another, so that the same lever can be operated either to propel or steer without the said operations interfering with one another.

The invention also consists in the combination, with the propelling-lever and driving-wheel, of changeable transmitting mechanism by which the relative speed of the said propelling-lever and driving-wheel may be varied with the consequent inverse variation in the proportion of power applied at the said lever and periphery of the wheel.

The invention also consists in details of construction, as hereinafter described.

Figure 1 is a side elevation, partly in section on the irregular line $x\ x$, (see Fig. 2,) of a tricycle constructed in accordance with this invention; Fig. 2, a plan view thereof; Fig. 3, a partial rear elevation in section on lines $y\ y$, Fig. 2; Figs. 4 and 5, details in plan and front elevation of the variable transmitting mechanism connected with the said propelling-lever, as hereinafter described; Fig. 6, a section thereof on line $z\ z$, Figs. 4 and 5; and Figs. 7, 8, and 9, details to be hereinafter referred to.

The frame-work consists essentially of a transverse axle, $a$, having its middle portion depressed or bent downward, as shown in Fig. 3, and the double perch $b\ b$, connected with the said axle and uniting at their rear end in a pivotal socket, $c$, for the upper end of the fork $d$, in which the rear wheel has its bearings. The said perch $b\ b$ supports upon suitable springs a seat, $e$, as shown in Fig. 1, and a foot rest or platform, $f$, is connected by light frame-work $g$ with the axle $a$.

The depressed portion of the axle $a$ (see Fig. 3) is provided with bearings $h$ for a rock-shaft, $i$, which is cranked or U-shaped at its middle portion, as shown at $j$, the said portion being connected with the actuating-lever $k$, which is adapted to rotate axially in a bearing at 2 in the said portion $j$, the said rotation taking place independently of the oscillating movement of the said lever $k$, by which the shaft $i$ is rocked in its bearings.

That portion of the lever $k$ that passes through the bearing 2 is connected by a universal or gimbal joint with a T-piece, $l$, on a spindle having a rotary movement in a vertical bearing upon the axle $a$ in such a manner that when the lever $k$ is rotated upon its axis by means of the handles $k'$ (see Fig. 2) the said T-piece $l$ will be rotated, such movement being possible at any position of the lever $k$ during its oscillating movement relative to the bearings $h$.

The T-piece $l$ is connected by cords $o$ (see Fig. 2) with a similar T-piece, $p$, fixed to the end of the fork $d$ of the steering-wheel of the tricycle, so that the rotary movement of the said piece $l$ will produce a corresponding rotation or change of position of the steering-wheel $d$, and will thus govern the direction of the movement of the tricycle.

The rock-shaft $i$ is provided with the two cranks $q$, connected by connecting-rods $r$ with cranks $s$, loose upon a shaft, $t$, mounted in bearings supported upon the axle $a$, so that as the lever $k$ is oscillated back and forth the cranks $s$ will be positively oscillated upon the said shaft $t$. The said cranks $s$ are provided with pawls $u$, (see Fig. 9,) which, acting upon a ratchet, $v$, keyed upon the said shaft $t$, cause the said shaft to rotate always in one direction. The said shaft $t$ has loose, but restrained from longitudinal movement thereon, a series of gears, $a^2\ b^2\ c^2$, of different diameter, meshing with a series of gears, $d^2$, fast upon a shaft, $e^2$, provided with a gear, $f^2$, meshing with a gear, $g^2$, (see Fig. 2,) fixed to the hub of the driving-wheel of the tricycle. The said shaft $t$ has splined thereon, so as to positively rotate therewith, but to have an independent longitudinal movement thereon, a series of clutches, $h^2$, operated by shippers $i^2$ to bring their teeth $j^2$ into engagement with corresponding recesses, $k^2$, (see Fig. 8,) in the adjacent side of the driving-gears $a^2\ b^2\ c^2$, so that either of the said gears may be positively connected with the shaft $t^2$ to transmit power through the corresponding one of the gears $d^2$ to the shaft $e^2$, gears $f^2\ g^2$, and driving-wheel of the tricycle.

It will readily be understood that when the gear $a^2$ is thus in operation the driving-wheel of the tricycle will be actuated with greater speed but less power relative to the force applied at the lever $k$ than when either of the gears $d^2$ or $c^2$ is thus operating, and that the gear $c^2$ will give the greatest power but the least speed to the driving-wheel.

The shippers $i^2$ are provided with lugs $l^2$, acted upon by springs $l^3$, tending to throw the said clutches into engagement with their corresponding gears. The said shippers are held with the clutches disengaged by locking devices $m^2$, (see Figs. 4, 5, 6,) the points $n^2$ of which engage the side of the shipper $i^2$, as shown in Figs. 5 and 6, until the desired one of the said locking devices $m^2$ is depressed by means of its operating-knob $o^2$, when the spring $l^3$ will throw the shipper so as to place the clutch in engagement.

When the clutch is disengaged by the operator taking hold of the lug $l^2$ or other portions of the shipper $i^2$ and pressing it against the spring $l^3$, the spring $p^2$ will throw the locking device $m^2$ up, so as to cause its end $n^2$ to again engage the shipper $i^2$.

It will be seen that when the gear $a^2$ is engaged by the clutch $h^2$ the gears $b^2\ c^2$ will travel faster than their corresponding clutches, $h^2$, and in order to prevent breakage in case two of the clutches should be engaged with their gears at the same time the rear sides of the teeth $j^2$ and of their corresponding holes, $k^2$, (see Figs. 7 and 8,) are inclined, as shown, so that in case the gear travels faster than the clutch it will merely, in acting upon the rear side of the said teeth, throw the clutch laterally out of engagement with the gear, overcoming the pressure of the spring $l^3$ on the shipper $i^2$ thereof.

The speed of the vehicle may be checked by suitable brakes applied either to the small wheel or to the large wheels, or, as herein shown, to both, in the following manner:

The foot-board $f$ is provided with a treadle, $a^3$, Figs. 1 and 2, adapted to be engaged by the heel or other portion of the foot of the occupant, and having attached thereto a cord, $b^3$, passing over a pulley, $c^3$, at the end of a brake-lever, $d^3$, and connected with the end of an arm, $d^4$, on a shaft, $d^5$, (see Fig. 2,) provided with brake-shoes $d^6$, so that by the single operation of the treadle $a^3$ both brakes are applied.

It is obvious that either of the brakes may be used alone, the cord being attached directly to the point $c^2$ of the brake $d^3$ or to an arm connected with the shaft $d^5$, but in this instance placed above instead of below it.

In practice the driving-gears shown at the right hand of Fig. 2 and in Figs. 4 and 5 will be inclosed in a suitable protecting-case.

I claim—

1. The combination of the propelling-lever and rock-shaft connected therewith, the cranks mounted on the said rock-shaft, the driving-wheel and shaft adapted to be operatively connected therewith, the cranks loose on the said shaft, and having a ratchet-and-pawl connection therewith, and also being connected with the cranks upon the rock-shaft, substantially as described.

2. In a tricycle, the combination of the driving-wheel, a shaft operatively connected therewith and having a series or cone of gears of different diameters, a second shaft, means to actuate it, and a series of gears loose thereon, meshing with the first-mentioned series, and a series of independent clutches splined on said shaft, and independent shippers therefor, whereby any of the said gears may be connected with the said shaft to propel the wheel, substantially as described.

3. In a tricycle, a shaft having a series of gears loose thereon and a series of clutches splined thereon, combined with a series of independent shippers for said clutches, locking devices for retaining the said shippers with the clutches disengaged, and means to automatically throw the said clutches into engagement when released by their locking devices, substantially as described.

4. The actuating-lever and rock-shaft connected to oscillate therewith, the said lever being pivoted to have an axial rotary movement, combined with a spindle connected with the said lever by a universal joint, and also connected with the steering-wheel, whereby the said wheel is turned by the rotary movement of the said lever when at any position in its oscillating movement, substantially as described.

5. The propelling-lever and rock-shaft connected therewith, combined with the driving-wheel of the tricycle, the shaft adapted to be operatively connected therewith, and devices having a ratchet-and-pawl connection with the said shaft, operated by the said propelling-lever and rock-shaft, substantially as described.

In testimony whereof I have signed my name to this specification in the presence of two subscribing witnesses.

FREDERICK WHITE.

Witnesses:
  JOS. P. LIVERMORE,
  W. H. SIGSTON.